(12) United States Patent
Kim et al.

(10) Patent No.: US 6,897,825 B2
(45) Date of Patent: May 24, 2005

(54) ANTENNA APPARATUS FOR FOLDER TYPE MOBILE PHONE

(75) Inventors: Kyung-Wook Kim, Taegu-Kwangyok-shi (KR); Jin-Woo Park, Kumi-shi (KR); Juh-Hyung Lee, Kwachon-shi (KR); Dong-In Ha, Seoul (KR); Krylov Konstantine, Suwon-shi (KR); Jong-Kui Park, Inchon-Kwangyok-shi (KR); Byung-Man Lim, Seoul (KR); Jung-Ho Park, Yongin-shi (KR); Sung-Kyung Kim, Seoul (KR); Joon-Ho Byun, Suwon-shi (KR); Wan-Jin Choi, Suwon-shi (KR); Dong-Hwan Kim, Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 60 days.

(21) Appl. No.: 10/281,720

(22) Filed: Oct. 28, 2002

(65) Prior Publication Data

US 2003/0137459 A1 Jul. 24, 2003

(30) Foreign Application Priority Data

Oct. 29, 2001 (KR) ......................................... 2001-66759
May 7, 2002 (KR) ......................................... 2002-24932

(51) Int. Cl.⁷ .............................. H01Q 9/26; H04B 1/40
(52) U.S. Cl. ........................ 343/803; 725/702; 455/88; 455/89; 455/52.1
(58) Field of Search ................................. 343/803, 725, 343/702, 872, 728; 455/52.1, 68, 69, 88, 89, 90, 95, 101, 66, 49.1, 73

(56) References Cited

U.S. PATENT DOCUMENTS

| | | | |
|---|---|---|---|
| 5,170,173 A | 12/1992 | Krenz et al. ................ | 343/702 |
| 5,649,306 A | 7/1997 | Vannatta et al. ............. | 455/575 |
| 6,006,117 A | 12/1999 | Hageltorn et al. ........... | 455/575 |
| 6,021,317 A | 2/2000 | Irvin ............................ | 455/78 |
| 6,272,324 B1 | 8/2001 | Rudisill et al. ............... | 455/90 |
| 2002/0002037 A1 * | 1/2002 | Ito et al. ..................... | 455/101 |

FOREIGN PATENT DOCUMENTS

| | | |
|---|---|---|
| JP | 04-337907 | 11/1992 |
| JP | 11136015 | 5/1999 |
| JP | 11-289207 | 10/1999 |
| WO | WO 97/23016 | 6/1997 |
| WO | WO 99/54956 | 10/1999 |
| WO | WO 00/30267 | 5/2000 |

OTHER PUBLICATIONS

Partial European Search Report dated Jan. 15, 2003, issued in a counterpart application, namely, Appln. No. 02024463.8.

European Search Report dated Apr. 4, 2003, issued in a counterpart application, namely, Appln. No. 02024463.8.

* cited by examiner

*Primary Examiner*—Tuyet Thi Vo
(74) *Attorney, Agent, or Firm*—Dilworth & Barrese LLP

(57) ABSTRACT

An antenna apparatus for a folder type mobile phone, wherein a first antenna is installed in a main body of the folder type mobile phone, and a second antenna is installed in the folder. The folder type mobile phone installs a main antenna apparatus in the main body, and an antenna apparatus for maximizing the diversity effect in the folder. As a result, it becomes more convenient to carry the folder type mobile phone based on the diversity mode, while securing a broader separation distance between two antennas at the same time.

6 Claims, 9 Drawing Sheets

ANTENNA APPARATUS FOR FOLDER TYPE MOBILE PHONE

PRIORITY

This application claims priority to an application entitled "Antenna apparatus for folder type mobile phone" filed in the Korean Industrial Property Office on Oct. 29, 2001 and assigned Ser. No. 01-66759, and filed in the Korean Industrial Property Office on May 7, 2002 and assigned Ser. No. 02-24932, the contents of both of which are hereby incorporated by reference.

BACKGROUND OF THE INVENTION

1. Field of the Invention

The present invention relates generally to a folder type mobile phone, and more particularly, to an antenna apparatus for a folder type mobile phone.

2. Description of the Related Art

Mobile phones have become increasingly developed, aiming for the smaller size, lighter weight, multi functions, and lower power consumption. An antenna, one of essential components of the mobile phone, is a crucial factor for determining speech quality.

A typically used antenna for the mobile phone is a combination of a helical antenna and a whip antenna, as illustrated in FIG. 1. When the mobile phone is in signal waiting state or the mobile phone's radio environment is favorable, only the helical antenna operates. On the other hand, when the mobile phone is used for conversation or the mobile phone's radio environment is poor, both the helical antenna and the whip antenna are operational. In general, an antenna is an electronic combination of a helical antenna and a whip antenna. The helical antenna has a relatively large volume and is generally affixed on the top end of the mobile phone. Depending on the antennas state, i.e., whether it is in an extended state or withdrawn state, the whip antenna's signals can be supplied or not.

In recent years, the mobile phones have been produced in diverse forms, such as, bar type, flip type or folder type. Among those, the folder type mobile phone is more popular among people. The folder type mobile phone is illustrated in FIG. 2 and FIG. 3. As depicted in the drawings, the folder type mobile phone includes a main body 100, a folder 200, and a hinge that connects the main body 100 to the folder 200 in a manner that they can rotate. The hinge acts as an opening/closing means for the folder 200 because the folder 200 rotates around a hinge shaft. The main body 100 of the folder type mobile phone includes an antenna apparatus 110 for extending or withdrawing toward the arrow direction on one side of the top end, a keypad 112 comprising a plurality of keys, and a transmitting block 114 with a built-in microphone at the lower side of the keypad 112. In addition, the main body 100 includes a side hinge arm 101 for attaching to the folder 200. The folder 200 includes a receiving block 210 with a built-in speaker apparatus on the top end, a LCD (Liquid Crystal Display) module 212 disposed at a lower side of the receiving block 210, and a center hinge arm 201 for combining to the side hinge arm 101.

To prevent a fading phenomenon the main body 100, in addition to the antenna apparatus 110, can further include a diversity antenna 111. That is, through combining signals that are received to these two antennas 110 and 111, respectively, optimal signals are detected, thereby preventing the fading phenomenon and getting better quality signals. As the diversity antenna 111 is more distant from the antenna apparatus 110, the aforementioned effect is improved.

One possible drawback of the antenna of the folder type mobile phone is that because the antenna is projected from a designated position of the main body, it is inconvenient to carry around the mobile phone. In addition, if a user drops the mobile phone, the antenna is easily damaged. Again, since the antenna is projected from the main body, designing the antenna itself is a difficult task. Unfortunately, all these problems are enhanced by applying the second diversity antenna to the microphone. Likewise, it is difficult to secure sufficient separation distance between the main antenna apparatus and the diversity antenna.

SUMMARY OF THE INVENTION

It is, therefore, an object of the present invention to provide an antenna apparatus for a folder type mobile phone, which is easy to carry and is capable of preventing damage on the antenna.

Another object of the present invention is to provide an antenna apparatus for a folder type mobile phone, which is capable of securing sufficient separation distance between a main antenna apparatus and a diversity antenna.

To achieve the above objects, there is provided an antenna apparatus for a folder type mobile phone in which the mobile phone opens/closes as a folder thereof rotates by a hinge apparatus connecting a main body to the folder, the antenna apparatus including: a first antenna, which is built in one side of the main body extending in a longitudinal direction, and operates when the folder of the mobile phone is open or closed; a second antenna, which is built in the same side of the folder extending in a longitudinal direction, and operates when the folder of the mobile phone is open; and a connecting block, which forms a contact point for connecting the top end of the first antenna to the bottom end of the second antenna.

Another aspect of the present invention provides an antenna apparatus for a folder type mobile phone mounted with a receiving block to prevent a fading phenomenon, wherein the folder type mobile phone opens/closes as a folder thereof rotates by a hinge apparatus connecting a main body to the folder, the antenna apparatus including: a first antenna connected to a transceiving block of the mobile phone, which is built in one side of the main body extending in a longitudinal direction and operates when the folder of the mobile phone is open or closed; a second antenna connectable to the receiving block, which is built in a different side of the folder extending in a longitudinal direction and separated from the first antenna by a designated distance, and operates when the folder of the mobile phone is open; and a connecting block, which forms a contact point for connecting the bottom end of the second antenna to the receiving block as the folder of the mobile phone is open.

Still another preferred embodiment of the present invention provides an antenna apparatus for a folder type mobile phone, in which the mobile phone opens/closes as a folder thereof rotates by a hinge apparatus connecting a main body to the folder, the antenna apparatus including: a first antenna, which is formed by combining a helical antenna with a whip antenna, being projected from one side of top end of the main body; and a second antenna, which is built in a different side of the folder extending in a longitudinal direction, and is electrically connected to a main board of the mobile phone.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
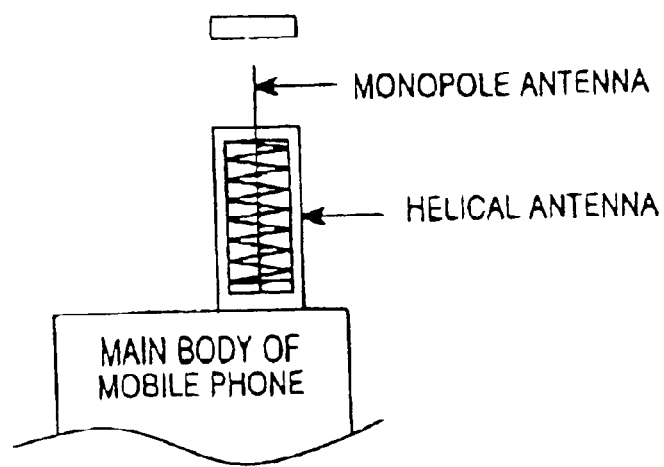
FIG. 1 is an explanatory block diagram of a mobile phone antenna apparatus in accordance with one embodiment of a related art.
Figure 2:
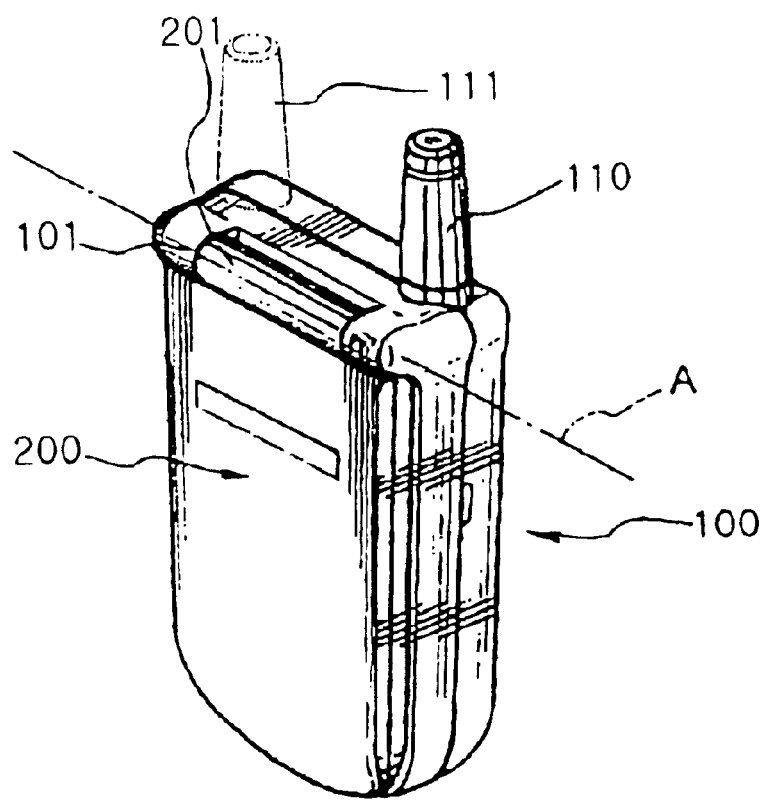
FIG. 2 is a perspective view of a closed folder type mobile phone to which the mobile phone antenna apparatus shown in FIG. 1 is applied.
Figure 3:
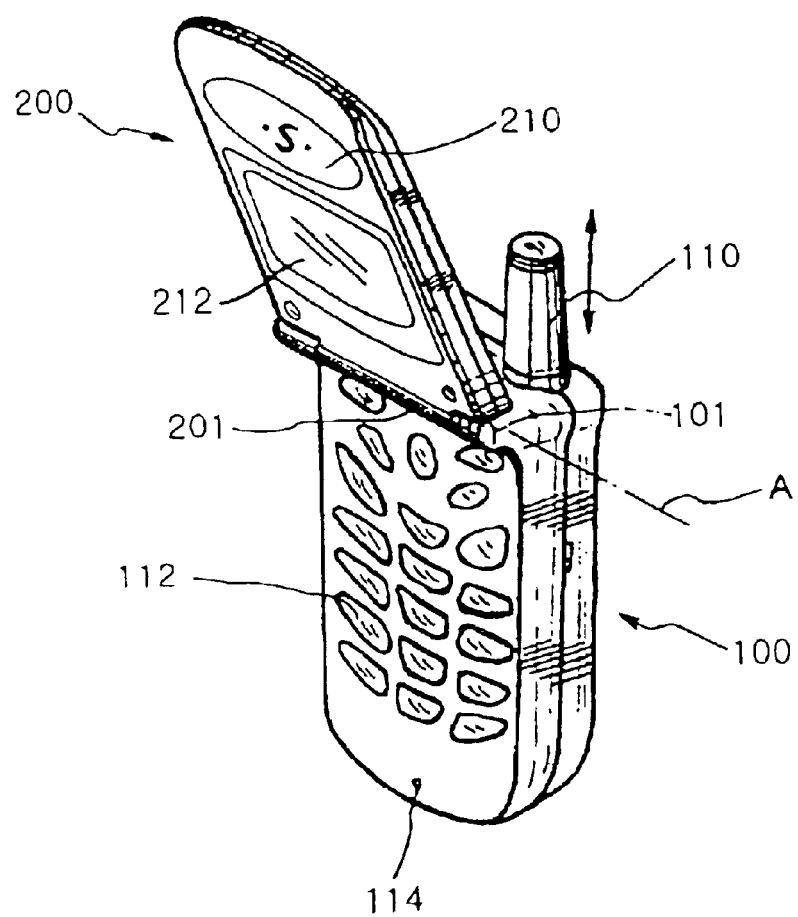
FIG. 3 is a perspective view of an open folder type mobile phone to which the mobile phone antenna apparatus shown in FIG. 1 is applied.
Figure 4:
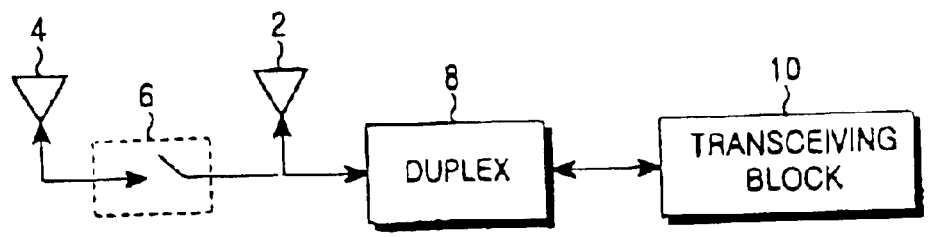
FIG. 4 is an explanatory block diagram of a mobile phone antenna apparatus in accordance with a first preferred embodiment of the present invention.

FIG. 4 is an explanatory block diagram of a mobile phone antenna apparatus in accordance with a first preferred embodiment of the present invention. As shown in the drawing, the antenna apparatus for a folder type mobile phone according to a first preferred embodiment of the present invention includes a first antenna 2, a second antenna 4, a connecting block 6, a duplexer 8, and a transceiving block 10. The first antenna 2 outputs receiving signals from a base station to the transceiving block 10 via the duplexer 8, and sends transmitting signals that are outputted from the transceiving block 10 via the duplexer 8 to the base station. The first antenna 2 is constructed in such manner that it works even when the folder of the mobile phone is closed, that is, the first antenna operates when the phone is in a call waiting state and also during conversation. The second antenna 4 performs the same function as the first antenna 2, except that the second antenna 4 does not operate when the folder is closed because it is connected to the first antenna 2 through the connecting block 6 only when the folder of the mobile phone is open.

Figure 5:
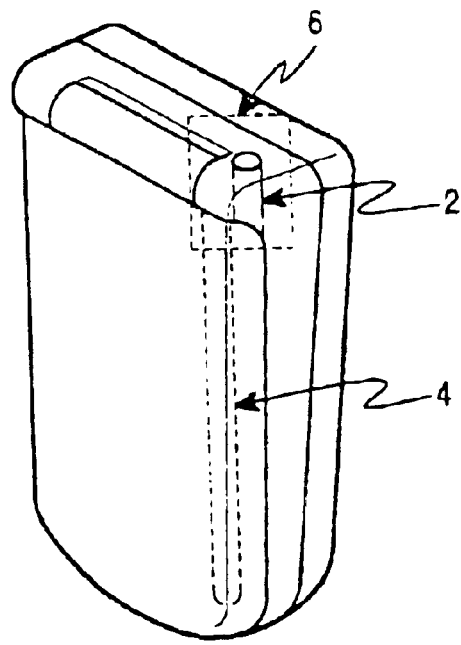
FIG. 5 is a diagram showing a closed folder type mobile phone to which the mobile phone antenna apparatus shown in FIG. 4 is applied.
Figure 6:
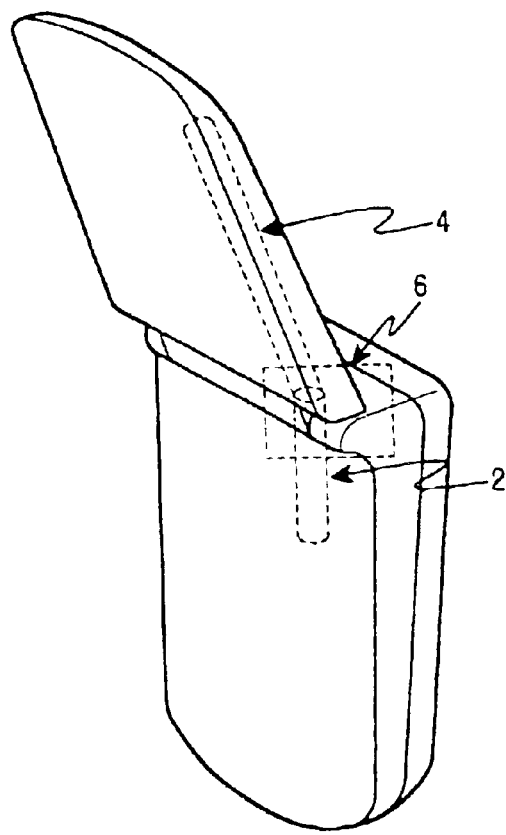
FIG. 6 is a diagram showing an open folder type mobile phone to which the mobile phone antenna apparatus shown in FIG. 4 is applied.

The antenna apparatus depicted in FIG. 4 is further detailed through FIGS. 5 and 6. FIG. 5 is a diagram showing a closed folder type mobile phone, to which the mobile phone antenna apparatus shown in FIG. 4 is applied, and FIG. 6 is a diagram showing the folder type mobile phone of FIG. 5 in an open position. As shown in the drawings, the first antenna 2 is built in one side of the main body of the mobile phone extending in a longitudinal direction, and the second antenna 4 is built in the same side of the folder extending in a longitudinal direction. Preferably, the first antenna 2 and the second antenna 4 are installed in corresponding positions so that their top end portions as shown in FIG. 5 are electrically connectable when the folder is open as shown in FIG. 6. As for the first antenna 2, a whip antenna may be used, and as for the second antenna 4, a helical antenna may be used. Of course, other kinds of antennas may be applied as well.

The connecting block 6 for connecting the first antenna 2 to the second antenna 4 is disposed at the top end of the main body, and comprises a metal contact point made between the two antennas 2, 4. In other words, the connecting block 6 comprises a metal contact point that is made between an end portion of the first antenna 2 and an end portion of the second antenna 4 when the folder is open, so these two antennas 2 and 4 operate together.

Figure 7:
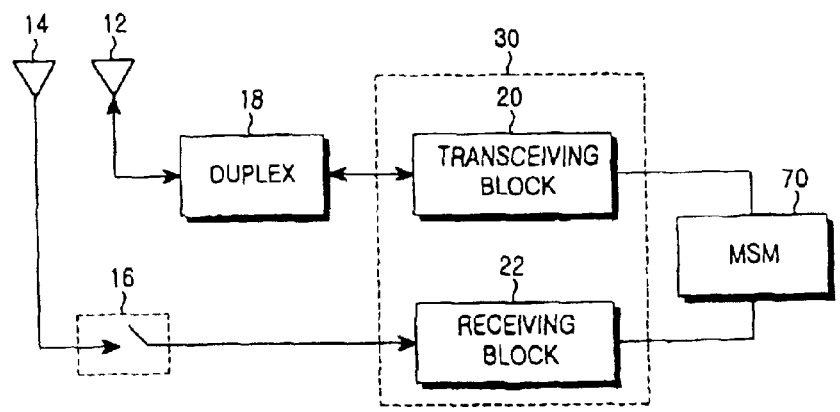
FIG. 7 is an explanatory block diagram of a mobile phone antenna apparatus in accordance with a second preferred embodiment of the present invention.
Figure 8:
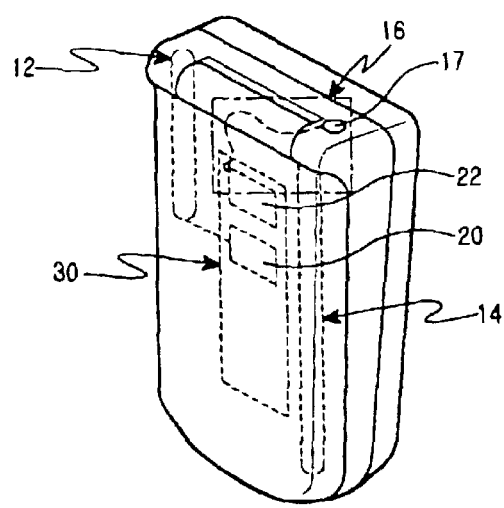
FIG. 8 is a diagram showing a closed folder type mobile phone to which the mobile phone antenna apparatus shown in FIG. 7 is applied.
Figure 9:
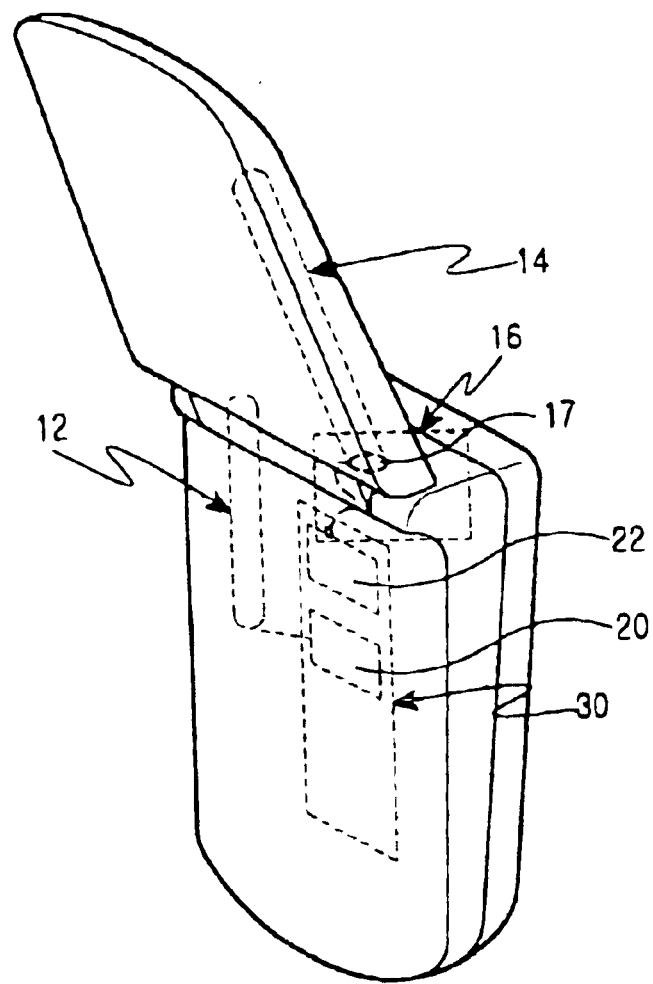
FIG. 9 is a diagram showing an open folder type mobile phone to which the mobile phone antenna apparatus shown in FIG. 7 is applied.

A similarly constructed antenna apparatus may be applied to a folder type mobile telephone that, besides the transceiving block, further includes a receiving block to prevent a fading phenomenon, in short, to a folder type mobile phone based on a diversity receiving mode. FIGS. 7–9 depict such an embodiment.

FIG. 7 is an explanatory block diagram of a mobile phone antenna apparatus in accordance with a second preferred embodiment of the present invention. As manifested in the drawing, the antenna apparatus for a folder type mobile phone according to a second preferred embodiment of the present invention includes a first antenna 12, a second antenna 14, a connecting block 16, a duplexer 18, a transceiving block 20, and a receiving block 22. The first antenna 12 outputs received signals from a base station to the transceiving block 20 via the duplexer 18, and sends transmitting signals that are outputted from the transceiving block 20 via the duplexer 18 to the base station. The first antenna 12 operates even when the folder of the mobile phone is closed, that is, the first antenna 12 works not only when the mobile phone is in the call waiting state and but also during conversation. The second antenna 14 outputs receiving signals from the base station to the received block 22. If the folder type mobile phone is open, the second antenna 14 is connected to the receiving block 22 by the connecting block 16 and works simultaneously with the first antenna 12 during the voice call or when text and image data is transceived. Data such as the voice call, the text or the image data is transmitted to the first antenna 12 from MSM (mobile station modem) chip 70 performing modem function through the transceiving block 20, and the received data is inputted to the MSM chip 70 through the transceiving block 20 and the receiving block 22.

The antenna apparatus for a mobile phone shown in FIG. 7 is further detailed through FIGS. 8 and 9. More specifically, FIG. 8 is a diagram showing a closed folder type mobile phone, to which the mobile phone antenna apparatus shown in FIG. 7 is applied, and FIG. 9 is a diagram showing the folder type mobile phone of FIG. 8 in on open position. As illustrated in the drawings, the first antenna 12 is built in at one side of the main body extending in a longitudinal direction, and is connected to the transceiving block 20 of the folder type mobile phone. Second antenna 14 is built in an opposite side of the folder extending in a longitudinal direction, and is connectable to the receiving block 22 of the folder type mobile phone. The first antenna 12 and the second antenna 14 are built in at different positions from each other, and more preferably, to get an optical diversity effect, they are disposed in a way to secure a maximum separation distance within the mobile phone.

As for the first antenna 12, a whip antenna can be used, and as for the second antenna 14, a helical antenna may be used. Of course, other kinds of antennas may be employed as well. The connecting block 16 that connects the second antenna 14 with the receiving block 22 comprises a metallic contact 17 disposed at the top end of the main body, that is electrical connected to the receiving block 22 included in a main board 30 of the folder type mobile phone. When the folder is open, an end of the second antenna 14 contacts the metallic contact 17, thus connecting second antenna 14 with the receiving block 22 in the main board of the mobile phone. Therefore the first antenna 12 and the second antenna 14 operate, respectively, during the conversation. To summarize again, when the folder is open, the second antenna, which is connected to the receiving block 22 by the connecting block 16, operates together with the first antenna 12.

Figure 10:
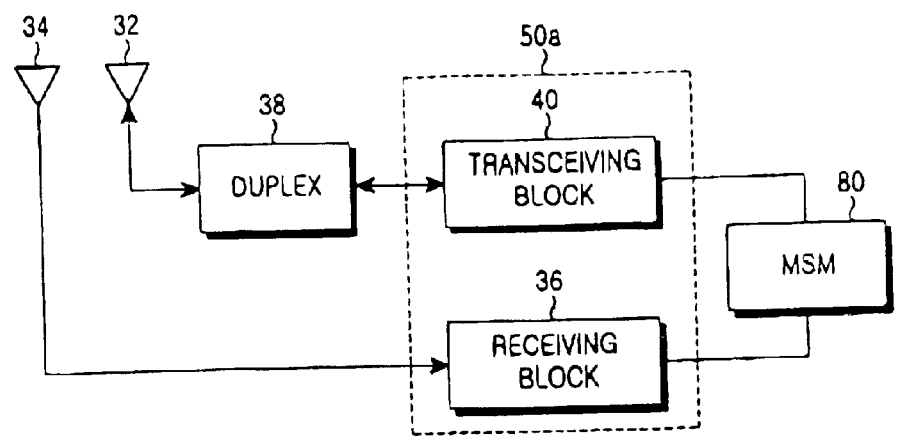
FIG. 10 is an explanatory block diagram of a mobile phone antenna apparatus in accordance with a third preferred embodiment of the present invention.

FIG. 10 is an explanatory block diagram of a mobile phone antenna apparatus in accordance with a third preferred embodiment of the present invention. The drawing illustrates the antenna apparatus for a mobile phone according to the second preferred embodiment of the present invention to which the antenna apparatus based on the diversity receiving mode is applied. The antenna apparatus in such case includes a first antenna 32, a second antenna 34, a duplexer 38, a transceiving block 40, and a receiving block 36. The first antenna 32 outputs received signals from a base station to the transceiving block 40 via the duplexer 38, and sends transmitted signals that are outputted from the transceiving block 40 via the duplexer 38 to the base station. The second antenna 34 outputs received signals from the base station to the receiving block 36. The first antenna 32 and the second antenna 34 operate all the time regardless of whether the mobile phone is in the busy state or call waiting state. Data such as the voice call, the text or the image data is transmitted to the first antenna 32 from the MSM chip 80 performing modem function through the transceiving block 40, and received data is inputted to the MSM chip 80 through the transceiving block 40 and the receiving block 36.

Figure 11:
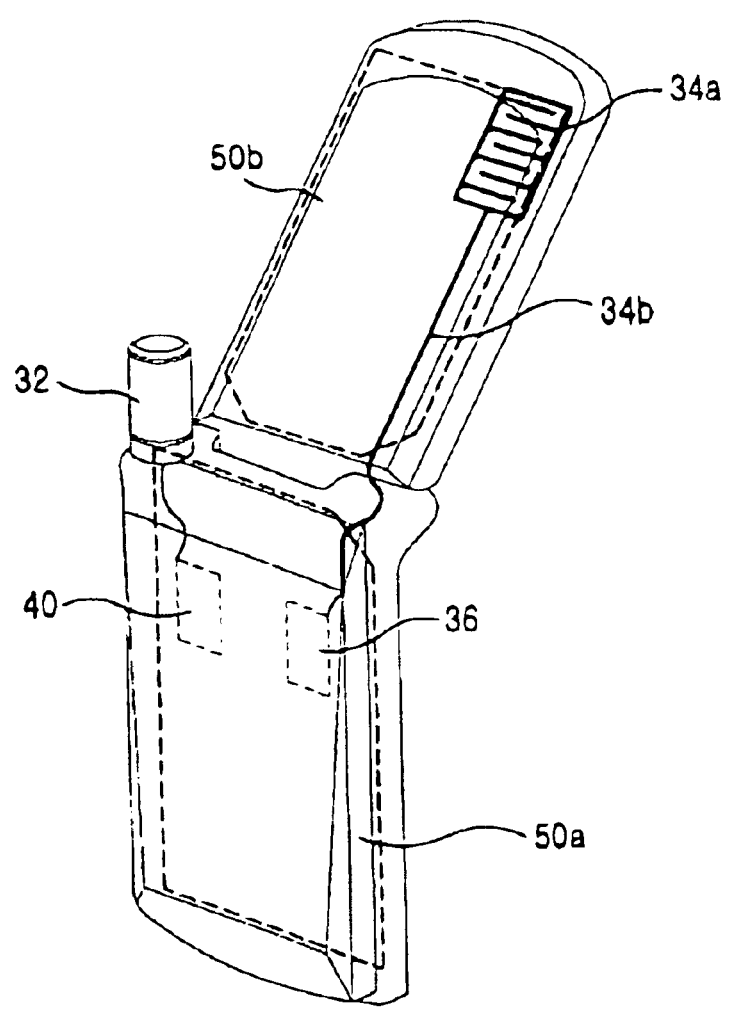
FIG. 11 is a diagram showing an open folder type mobile phone to which the mobile phone antenna apparatus shown in FIG. 10 is applied.

The antenna apparatus represented in FIG. 10 is now more detailed in FIG. 11. Specifically, FIG. 11 is a diagram showing an open folder type mobile type mobile phone to which the mobile phone antenna apparatus shown in FIG. 10 is applied. As depicted in the drawing, the first antenna 32 is projected from one side of the main body of the folder type mobile phone, and can be a combination of a helical antenna with a whip antenna. Even though the present invention illustrates a case where the first antenna 32 is projected from one side of the mobile phone, it may alternatively be built in the main body of the mobile phone as well, as in the related art. Second antenna 34a is built in the folder of the folder type mobile phone. The second antenna 34a may be implemented by forming an antenna pattern on a flexible print circuit substrate 50b mounted in the folder, or on the inner wall of a housing of the folder, or the second antenna 34a may be implemented by installing a small helical antenna. To maximize the diversity effect within the limited space of the folder type mobile phone, the second antenna 34a is located in a place where the separation distance from the first antenna 32 is at its maximum.

TABLE 1

|  | In case the first and the second antennas are mounted in the main body | In case that the second antenna is built in the folder |
| --- | --- | --- |
| Separation distance | 4 cm and below | 6 cm and above |
| Isolation | −10 dB∼−6 dB | −20 dB and above |

Referring to Table 1, by installing the first antenna 32 in the main body and the second antenna 34a in the folder, each antenna's ground is separated from each other, and more separation distance can be secured. Therefore, it is shown that the isolation characteristic, i.e., deterioration of an antenna gain caused by mutual interference of adjacent antennas in the antenna apparatus based on the diversity receiving mode, is much improved.

A fixed wire connection 34b is shown for connecting the second antenna 34a with the main board 50a, and forms the connecting block of the prior embodiment. For a flexible print circuit substrate 50b mounted in and the folder, a flexible print circuit or radio frequency coaxial cable can be used.

The first antenna 32 and the second antenna 34 operate all the time regardless of whether the mobile phone is in the busy state or call waiting state. In fact, the separation distance between the first antenna 32 and the second antenna 34 is at its maximum when the mobile phone is in the busy state (i.e., the folder is open). Therefore, it is possible to reduce the drop rate and to enhance speed quality by increasing the diversity effect and by improving the isolation characteristic.

Figure 12:
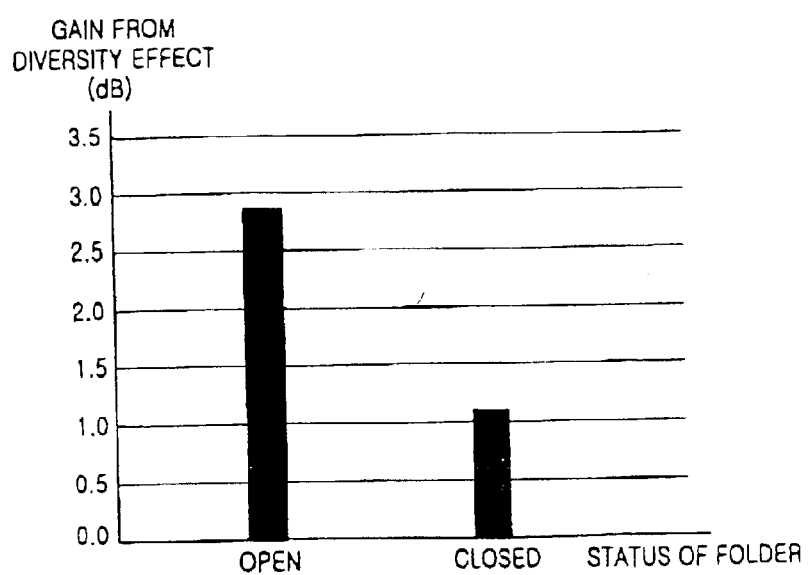
FIG. 12 diagrammatically represents an antenna gain by a diversity effect of the antenna apparatus for the folder type mobile phone depicted in FIG. 11.

Lastly, FIG. 12 diagrammatically represents an antenna gain by a diversity effect of the first antenna 32 and the second antenna 34. As the graph shows, the diversity effect resulted in better antenna gains, for example, when the folder is open, the antenna gain was increased by 2.5 dB to 3.0 dB, and when the folder is closed, the antenna gain was increased by 1.0 dB to 1.5 dB.

While the invention has been shown and described with reference to a certain preferred embodiment thereof, it will be understood by those skilled in the art that various changes in form and details may be made therein without departing from the spirit and scope of the invention as defined by the appended claims.

In conclusion, the antenna apparatus for a folder type mobile phone embodying the principles of the present invention has an antenna built in the main body and the folder, so it became much more convenient to carry the folder type mobile phone, and the antenna is rarely damaged by an external shock. Likewise, the folder type mobile phone based on the diversity receiving mode installed a main antenna apparatus in the main body, and installed an antenna apparatus for maximizing the diversity effect in the folder, and as a result thereof, the separation distance between two antennas became broader.

What is claimed is:

1. An antenna apparatus for a folder type mobile phone mounted with a receiving block to prevent a fading phenomenon, wherein the folder type mobile phone opens/closes as a folder thereof rotates by a hinge apparatus connecting a main body to the folder, the antenna apparatus comprising:
- a first antenna, connected to a transceiving block of the mobile phone and built in one side of the main body extending in a longitudinal direction, and for operating when the folder of the mobile phone is both open and closed;
- a second antenna, connected to the receiving block and built in a side of the folder different from the one side and extending in a longitudinal direction and separated from the first antenna by a designated distance, and for operating only when the folder of the mobile phone is open; and
- a connecting block for connecting the bottom end of the second antenna to the receiving block when the folder of the mobile phone is open.

2. The antenna apparatus as claimed in claim 1, wherein the first antenna is formed by combining a helical antenna with a whip antenna.

3. The antenna apparatus as claimed in claim 1, wherein the first antenna is built in one side of top end of the main body of the mobile phone.

4. The antenna apparatus as claimed in claim 1, wherein the second antenna comprises an antenna pattern formed on a flexible print circuit substrate mounted in the folder.

5. The antenna apparatus as claimed in claim 1, wherein the second antenna comprises an antenna pattern formed on an inner side of the folder's housing.

6. The antenna apparatus as claimed in claim 1, wherein the second antenna is comprised of a small helical antenna.

* * * * *